(12) United States Patent
Kirshenbaum

(10) Patent No.: US 8,447,587 B2
(45) Date of Patent: May 21, 2013

(54) PROVIDING A POSITION-BASED DICTIONARY

(75) Inventor: Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1436 days.

(21) Appl. No.: 11/700,465

(22) Filed: Jan. 31, 2007

(65) Prior Publication Data

US 2008/0103762 A1    May 1, 2008

Related U.S. Application Data

(62) Division of application No. 11/588,690, filed on Oct. 27, 2006.

(51) Int. Cl.
*G06F 17/27* (2006.01)
(52) U.S. Cl.
USPC ............. 704/9; 704/7; 704/8; 704/10
(58) Field of Classification Search
None
See application file for complete search history.

(56) References Cited

U.S. PATENT DOCUMENTS

| | | | |
|---|---|---|---|
| 5,857,179 A | 1/1999 | Vaithyanathan et al. | |
| 6,253,170 B1 * | 6/2001 | Dolan | 704/10 |
| 2002/0026456 A1 * | 2/2002 | Bradford | 707/500 |
| 2003/0105638 A1 * | 6/2003 | Taira | 704/275 |
| 2003/0177000 A1 * | 9/2003 | Mao et al. | 704/9 |
| 2003/0236659 A1 | 12/2003 | Castellanos | |
| 2004/0236729 A1 | 11/2004 | Dingledine et al. | |
| 2005/0149846 A1 | 7/2005 | Shimizu et al. | |
| 2006/0085248 A1 | 4/2006 | Arnett et al. | |
| 2008/0103760 A1 | 5/2008 | Kirshenbaum | |
| 2008/0103773 A1 | 5/2008 | Kirshenbaum | |

OTHER PUBLICATIONS

Office Action dated Aug. 7, 2007 from U.S. Appl. No. 11/588,690.
Office Action dated Jan. 22, 2008 from U.S. Appl. No. 11/588,690.
Office Action dated Aug. 6, 2007 from U.S. Appl. No. 11/700,430.
Office Action dated Jan. 22, 2008 from U.S. Appl. No. 11/700,430.

* cited by examiner

*Primary Examiner* — Leonard Saint Cyr

(57) ABSTRACT

A computer executable method includes receiving word senses associated with respective definitions, and providing a position-based dictionary that assigns the word senses to respective semantic positions in a semantic space.

22 Claims, 5 Drawing Sheets

PROVIDING A POSITION-BASED DICTIONARY

CROSS-REFERENCE TO RELATED APPLICATION

This is a divisional of U.S. Ser. No. 11/588,690, entitled "Identifying Semantic Positions of Portions of a Text," filed Oct. 27, 2006, which is hereby incorporated by reference.

BACKGROUND

A challenge facing data management systems that manage text, such as articles, web pages, survey responses, electronic mail messages, support documents, books, and so forth, written by humans (or by computers) is the identification of what the textual data is about. Basically, the challenge involves identifying an accurate set of one or more topics for each item of textual data. Once items of textual data have been categorized into various topics, a data management system would be able to use this categorization to perform various tasks with respect to the textual data, such as deciding where to store the textual data items, searching for information, or other tasks.

Conventionally, classifiers have often been used to select one or more topics, from a set of possible topics, to assign to each item of textual data. However, classifier-based techniques for assigning topics to pieces of textual data are associated with various drawbacks that can make classifications performed by classifiers inaccurate.

BRIEF DESCRIPTION OF THE DRAWINGS

Some embodiments of the invention are described with respect to the following figures.

DETAILED DESCRIPTION

In accordance with some embodiments, semantic positions of portions of text items are identified. A text item refers to any collection of textual data that can be created or written by a human or a machine (such as a computer). Examples of text items include electronic mail messages, articles, survey responses, web pages, support documents, books, and so forth. Note also that a text item can be derived from other sources of data, such as audio data (which can be transcribed into text), video data (which can be processed to extract text, such as from sign language), or other types of data. The portions of each text item for which a semantic position can be identified include one or more of the following: sentences, paragraphs, sections, chapters, or any other portion that is less than an entirety of a text item. A "semantic position" is defined as a position in a semantic space that is an n-dimensional continuous space, with arbitrary dimensionality n. In one example implementation, the value of n can be in the range of 5 to 10. However, in other implementations, other values of n can be used. The semantic space is continuous, so that a semantic position refers to a tuple in $R^n$. In other embodiments, a discrete space or a discrete approximation to a continuous space may be used. In general, a "semantic space" is defined as a space having n dimensions, with n being any value greater than one.

In some embodiments, the specific values of the semantic positions of different portions of a text are irrelevant. However, the distance between semantic positions in the semantic space corresponding to any two portions of a text item reflects a degree of semantic similarity between the two portions of the text item.

Once the semantic positions of portions of each text item have been identified, one or more tasks can be performed with respect to the text item. As examples, the tasks performed include identifying one or more topics associated with the text item, translating the text item, performing a search with respect to the text item, making storage decisions with respect to the text item, enforcing policies with respect to the text item, routing text items to different locations, or other tasks.

Figure 1:
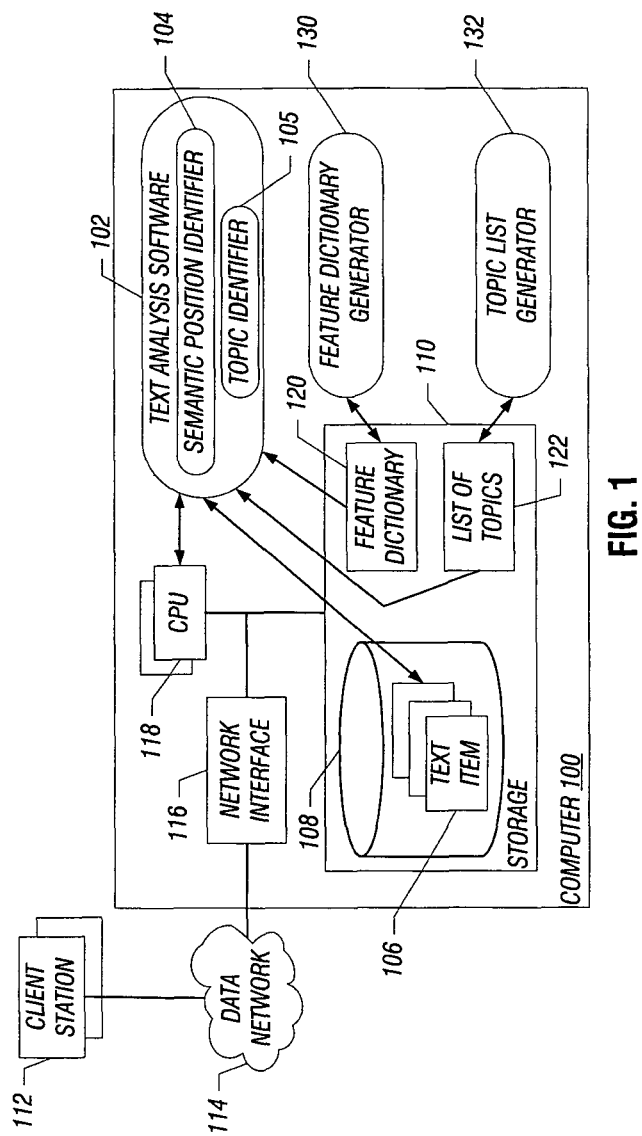
FIG. 1 is a block diagram of a computer that includes text analysis software, in accordance with some embodiments.

FIG. 1 shows text analysis software 102 that is executable in a computer 100. The text analysis software 102 includes a semantic position identifier 104 for identifying semantic positions of various portions of each text item, where each text item is identified by reference numeral 106 in FIG. 1. The text analysis software 102 also includes a topic identifier 105 for identifying topics of the text items 106, based on semantic positions determined for the portions of the text items determined by the semantic position identifier 104.

The semantic position identifier 104 receives as an input a text item 106, and based on the text item 106 as well as a position-based feature dictionary 120 (explained further below), identifies semantic positions for respective portions of the text item 106. Using the semantic positions identified for portions of the text item 106, the text analysis software 102 (or some other software in the system) is able to perform various tasks with respect to text item 106 (and other text items for which semantic positions have been identified).

The text items 106 are stored in a data collection 108 (or multiple data collections 108, which can be databases, file systems, etc.), which is (are) contained in a storage 110 (e.g., volatile memory, a disk-based storage system, a semiconductor-based storage system, etc.). Alternatively, the text items 106 can be acquired on-the-fly, such as from an input stream of data or from some other source. The text items 106 can be provided to the data collection 108 locally by the computer 100 or remotely from one or more client stations 112 over a data network 114 (e.g., a local area network, a wide area network, the Internet, etc.). The computer 100 in some implementations are connected to the data network 114 through a network interface 116. Alternatively, the computer 100 can operate as a stand-alone computer. The network interface 116 is connected to the storage 110 and to one or more central processing units (CPUs) 118. The text analysis software 102 and other software in the computer 100 are executable on the CPU(s) 118.

In some embodiments, the position-based feature dictionary 120 noted above maps word forms to records. As used here, the term "word form" (or more simply "word") refers to a string of characters that represent a particular word in a text item. Each word form is associated with one or more senses. The multiple senses of a word refer to the multiple uses of the word form. For example, a definition of the word form "carrot" as found in Merriam-Webster's Collegiate Dictionary, Tenth Edition, is as follows:

> Carrot n 1: a biennial herb (*Daucus carota* of the family Umbelliferae, the carrot family) with a usu. orange spindle-shaped edible root; also: its root 2: a reward or advantage offered esp. as an inducement This definition of the word form "carrot" covers two senses, with one sense of "carrot" being a biennial herb, and the second sense of the word "carrot" being a reward or advantage offered. In some embodiments, each of the records in the feature-based dictionary 120 mapped to a word form contains (1) a semantic position in the semantic space, (2) syntactic information (such as part of speech or subcategorization information), and (3) an indication of the likelihood that this record is the correct record for the word form. Note that elements (2) and (3) mentioned above can be omitted from the records of the feature dictionary 120 in some other embodiments. Each word form can map onto several records (associated with respective senses) of the feature dictionary 120. Some records may not contain a semantic position; such records indicate that the particular sense of the word form is purely functional (in other words, the word form does not meaningfully contribute to the semantics of a portion of the text item, such as a sentence, in which the word form appears). A given word form may refer to both functional and non-functional records (senses). Note that the text analysis software 102 is able to understand various dictionary-specific abbreviations that may be contained in word definitions (such as "usu." in the definition of "carrot" above). Other items that may appear in a dictionary definition include words that are highlighted (such as italicized "also" above), which can indicate alternate meanings or which can indicate that the sense is purely functional and can be ignored.

In some embodiments, the computer 100 also stores a list of topics 122, which is used by the topic identifier 105 to identify a topic of a text item (or a portion of the text item) based on a semantic position of the text item (or position of the text item). The list of topics 122 is a representation of a function that allows a particular semantic position (or a set of semantic positions) to be determined to belong to one or more topics. Alternatively, the function allows the computation of a strength or a probability of a semantic position being associated with each of a set of topics. In one implementation, each topic in the list of topics 122 is a name with a corresponding position (or some other rule) that allows the topic identifier 105 to decide whether or not a semantic position should be considered within the topic. Other examples of such a rule include a boundary surface or a Boolean function that is based on the coordinates in the semantic space.

In one simple implementation, the list 122 enumerates a set of topics and associates with each topic a semantic position. A semantic position is considered to belong to the topic whose semantic position is closest. In some embodiments, the list 122 may be hierarchical. In such a hierarchical list, the top-level topic (the topic at the top level of the hierarchy of topics) with the closest semantic position is chosen. Then, within the second-level topics beneath the selected top-level topic, the one topic in the second level with the closest position to the semantic position of the portion of the text item being considered is chosen. This is repeated for the remaining topics in the remaining levels of the hierarchy, if they exist.

In some other embodiments, each topic may be associated with a radius in addition to a semantic position (where the radius defines a radius about the semantic position). In this embodiment, each topic is seen as an n-dimensional sphere, and a semantic position is considered to be in the topic if the semantic position is within the topic's sphere. The spheres for different topics may overlap, and therefore positions may be considered to be in more than one topic, even at the top level of the hierarchy.

Alternatively, topics in the list 122 may be associated with arbitrarily-shaped regions of semantic space. Such regions may be defined by any of several forms of n-dimensional curved surfaces or by meshes similar to those used to create three-dimensional solids in computer-generated animation. The regions may not be contiguous and may contain holes. As with the spherical approach, a position is considered to be in the topic if the position is within the topic's region.

In yet another implementation, a topic in the list 122 may be associated with a function (implemented as a software module) that takes a semantic position as input and returns a Boolean value that determines whether or not the position is in the topic. Such a representation would allow topics of arbitrary semantic complexity.

As an alternative, rather than having to decide whether a position absolutely belongs to a particular topic, the list 122 can provide a mechanism for deciding how likely or how strongly (such as in terms of a probability or strength, for example) a position belongs to a particular topic. In such an arrangement, the topic(s) associated with a position may be the topic whose strength or probability is the highest, for all topic(s) whose strength or probability is above some predefined threshold. For this alternative, a decision procedure can be used to return a real number rather than a Boolean value for representing the probability or strength that a particular semantic position belongs to a particular topic.

In accordance with some embodiments, the semantic position identifier 104 processes each text item 106 by processing the sentences one at a time (such as in sequence). Rather than process a text item one sentence at a time, the semantic position identifier 104 can process other types of portions in the text item. The semantic position identifier 104 determines the appropriate senses for the word forms that appear in each sentence. Note that certain words, such as "the," "a," or "from," may not be associated with semantic positions, since such words are functional words (words that do not meaningfully contribute to the semantics of the sentence). Once the appropriate senses for the relevant words of a sentence are determined, the semantic positions of the respective senses (as determined from the position-based feature dictionary 110) are used for determining a semantic position of the sentence as a whole. Each of the sentences of the text item is processed in like manner to produce semantic positions for corresponding sentences.

In some embodiments, the semantic positions of the sentences can then be used for determining semantic positions of higher-level portions of the text item, such as paragraphs, sections, chapters, and so forth. For example, the semantic position of each paragraph is derived from semantic positions of sentences in the paragraph, the semantic positions of each section is derived from the semantic positions of the paragraphs in the section, and so forth. The semantic position(s) of the relevant portion of the text item, or the semantic positions of the entire text item (which can be calculated from semantic positions or portions of the text item) is then used by the text analysis software 102 (or other software) to perform tasks, such as identifying the relevant topic(s) for the text item based on the list of topics 122 (or any of the other tasks listed earlier).

Figure 2:
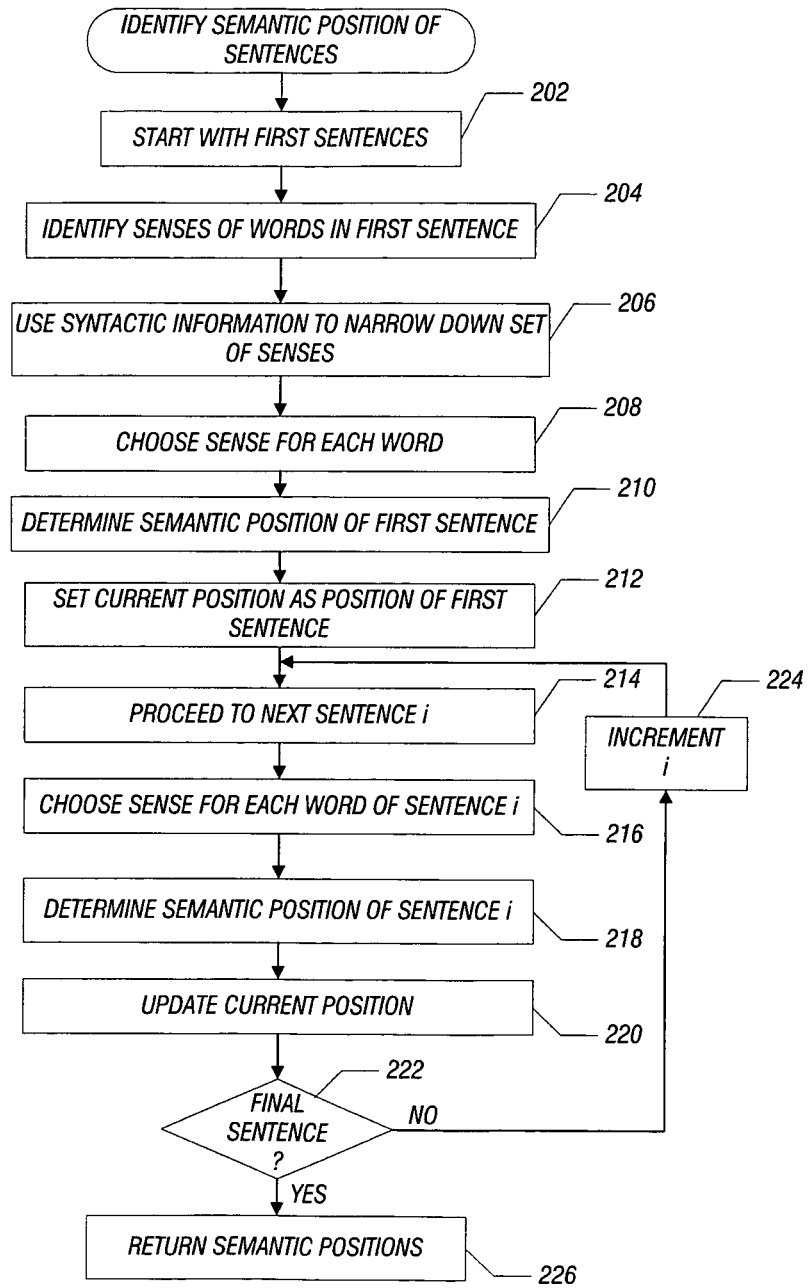
FIG. 2 is a flow diagram of a process of identifying semantic positions of sentences in a text, in accordance with some embodiments.

FIG. 2 shows a procedure for identifying semantic positions of sentences, in accordance with an embodiment. The procedure starts (at 202) with the first sentence of the text item. The "first sentence" refers to the sentence that physically appears first in the text item, or alternatively, to any sentence in the text item that is first selected for processing in the procedure depicted in FIG. 2. Next, the senses of words in the sentence are identified (at 204). The first sentence has a sequence of word forms, which can be found in the feature dictionary 120. If a word form does not have a dictionary entry, then it is assumed that syntactically the word form can be almost anything and semantically will contribute no information. However, in some implementations, information can be built up regarding the word form that does not have a dictionary entry.

To identify the senses of words in the sentence, syntactic information associated with the senses (as maintained in the records of the feature dictionary 120) can be used to narrow down the set of senses that is to be considered. For example, in the sentence:

Each of the runs terminated normally.

it can be determined that "runs" is a noun, not a verb, because of the preceding "the." Thus, all of the verb senses associated with "runs" may be eliminated from consideration.

In some implementations, task 206 can be omitted. At this point, each (or most) of the words in the first sentence is associated with a set of senses, and each of these senses has an associated semantic position, as specified in the feature dictionary 120. The next task is to choose (at 208) the single most appropriate sense for each word in the sentence. The basic approach is to try to find the most compatible set of senses, where the set of senses includes the senses for words on the sentence. There are several techniques for finding the most compatible set of senses.

In the greedy approach, according to one implementation, the procedure starts with a single candidate set for the sentence. This candidate set can include a randomly chosen sense for each word or, if there is likelihood information associated with each sense (as maintained in the feature dictionary 120), the most likely sense for each word can be chosen. Each of the senses in the candidate set is associated with a semantic position (as defined by the feature dictionary 120), and the semantic positions are combined to obtain a single centroid position (based on some aggregation, such as an average, of the semantic positions of the senses in the candidate set). A fitness measure is then computed based on the distances from the semantic positions of respective senses in the candidate set to the centroid. The fitness measure can be a mean, mean square, mean log, harmonic mean, maximum, median, and so forth. The fitness measure can also be an average that gives progressively more or less weight to senses based on their ordinal distance to the centroid. In other words, a nearer sense is weighted less or more heavily than a farther sense.

Alternatively, rather than compute the centroid using all senses in the candidate set, the centroid can be based on a subset of the candidate set. Different subsets of the candidate set are considered (such as by leaving out different words in turn), with the centroid of the most compatible subset chosen. The most compatible subset is the one associated with a centroid that has the best fitness measure based on distances from all senses in the candidate set to the centroid of the subset.

Next, in the greedy approach, the semantic position identifier 104 determines whether a small change—typically the replacement of one sense by another sense of the same word for a randomly chosen word or, probabilistically, for each word—would improve the fitness measure. Each such substitution is tried in turn and the corresponding fitness measure is computed. If improvement in the fitness measure is detected, the modified candidate set of senses is selected as the new "current best," or changes can continue to be made to the current best and the new current best is set as the one with the biggest improvement. In any case, the process above is iterated until no further improvements are possible, or until some computation budget or stopping rule is exceeded. The centroid of the last "current best" set is taken to be the semantic position of the sentence as a whole.

A second approach is a genetic algorithm approach. In this approach, the centroid and fitness measure of each candidate set is defined in the same manner as above. However, rather than start with a single candidate set, this approach starts with a population of candidate sets. For each of the candidate sets, a fitness measure is computed. Next, candidates are chosen to be parents based on their fitness measures, with those having better fitness measures being more likely to be chosen. Each candidate has a genotype (or gene) which encodes the sense chosen for each word in the sentence. Offspring are created from parents by modifying and/or combining the parents' genotypes using genetic operations, such as crossover and mutation. The result of reproduction is a new population of candidate sets, and the process iterates until a computation budget is exceeded or until it is determined that no further improvement can be made. The candidate set with the best fitness measure in the final population (or the best one seen overall) is taken as the "winner," and its centroid is taken to be the semantic position of the sentence as a whole.

In another approach, if the number of possible candidate sets of senses is small enough, then an exhaustive search can be performed over all of the combinations of possible candidate sets. The centroid of the candidate set with the best fitness measure (as determined based on the exhaustive search) is used as the semantic position of the sentence as a whole.

In a further approach, an analytic approach, such as linear programming, integer programming, or mixed integer programming, is used to find an optimal or approximately optimal set of senses to maximize or minimize (as appropriate) the chosen fitness measure.

Once the most compatible set of senses for the first sentence has been identified (using any of the approaches discussed above or any other optimization algorithm), the semantic position of the first sentence is determined (at 210) based on the semantic positions of the senses in the set of most compatible senses.

A similar procedure as discussed above is performed for subsequent sentences (where each next sentence is referred to as "next sentence i" or "sentence i" and where i is successively incremented for each new sentence processed), with the following modification. Having processed the first (or prior) sentence, the semantic position identifier 104 has some idea of what the particular text item is about. The current semantic position when processing the next sentence i is set (at 212) equal to the semantic position of the first sentence. This current semantic position is used for computing both the centroid and the fitness measure of sentence i. This approach allows the semantic position identifier 104 to take advantage of the fact that the topic of a text item tends not to abruptly shift between sentences. However, the current position (which is based on the position of the prior sentence) may not be accorded as much weight as semantic positions of the senses of words in sentence i, since there is some likelihood that sentence i is discussing a different topic than the topic of the prior sentence. The actual weighting used for the current position and the positions of senses of sentence i may depend on the type of break that exists between the prior sentence and the current sentence i. The current position should be accorded more weight if the current sentence i is a subsequent sentence within the same paragraph. However, the current position would be accorded less weight if the current sentence i is the first sentence of a new paragraph (different from the paragraph of the prior sentence). Moreover, the current position would be accorded even less weight if the current sentence is the first sentence in a new section or chapter. In the extreme case, the first sentence overall of the text item is seen as the one with the current position accorded a weight of 0. As an alternative, for the first sentence, if there is some indication (such as a guess) of the topic of the overall text item, then this indication can be used to set the current position of the first sentence (assigned some relatively low weight).

Note that starting with the third sentence and for each subsequent sentence, the current semantic position does not represent the semantic position of just the prior sentence—rather, the current semantic position represents a semantic position of the aggregate of prior sentences. Moreover, it is noted that in some other embodiments, the current semantic position even for the second sentence would not represent just the semantic position of the prior sentence—instead, the current semantic position can take into account a semantic position that is based on a guess or estimate of what the overall text should be about. Note also that the current position (based on the position of the prior sentence or prior sentences) can be taken into account when computing the initial candidate set for the greedy algorithm by choosing, for each word, the sense whose position is closest to the current position, as one example.

The semantic position identifier 104 turns to the next sentence i in the text item (at 214). The sense for each word of sentence i is then chosen (at 216), taking into account the current position as noted above. Choosing the best candidate set of senses for sentence i is also an iterative process that iteratively considers the fitness of respective different candidate sets, similar to the technique used for the first sentence. Once the best candidate set of senses for sentence i has been chosen, the semantic position of sentence i is determined (at 218), which is the combination of the current semantic position (updated after the prior sentence) and the position based on the senses of sentence i. The current semantic position can then be updated (at 220), such as taking a weighted average of the position of the sentence (based on the chosen senses of sentence i) and the current semantic position (based on the position of the prior sentence). The updated semantic position is passed as the current semantic position when processing the subsequent sentence (after sentence i). In other implementations, some other combining of the current position and position based on senses can be performed.

For example, the update can be as follows:

$$\text{Current\_Position}(S_{i+1}) = W1 \times \text{Current\_Position}(S_i) + W2 \times \text{Position\_Senses}(S_i),$$

where $S_i$ represents sentence i, Current_Position($S_i$) represents the current position when processing sentence i, Position_Senses($S_i$) represents the semantic position of sentence i based on semantic positions of the senses of the best candidate set, W1 represents the weight to apply for the current position, and W2 represents the weight to apply for the position based on senses. Typically, W1 and W2 will both be non-negative and will sum to 1.

The process then determines (at 222) whether the final sentence of the text item has been processed. If not, then i is incremented (at 224) and the process returns to task 214. If the final sentence has been processed, then the semantic position identifier 104 returns (at 226) the positions of the various sentences of the text item.

Note that the current position that is updated at 220 is based on some aggregation of positions of all prior sentences, with exponential decay used to give experimentally less weight (W1) to progressively earlier sentences. Thus, if the weight to be accorded a prior sentence is 0.2, then the updated current position, Current_Position($S_3$) (updated at 220) when processing sentence 2 ($S_2$) is calculated as follows:

$$\text{Current\_Position}(S_3) = 0.2 \times \text{Current\_Position}(S_2) + 0.8 \times \text{Position\_Senses}(S_2).$$

To calculate the updated current position after processing sentence 3, the following formula is used: Current_Position($S_4$)=0.2×Current_Position($S_3$)+0.8×Position_Senses($S_3$). Note that Current_Position($S_3$) as multiplied by the factor of 0.2 actually also factors in the position of sentence 1, except that the weight accorded to the position of sentence 1 is subject to exponential delay in the form of 0.2×0.2 (or 0.04). In other words, in calculating the current position for sentence 3, the weight to be accorded the first sentence is 0.04, which is much less than the weight accorded to sentence 2.

Figure 3:
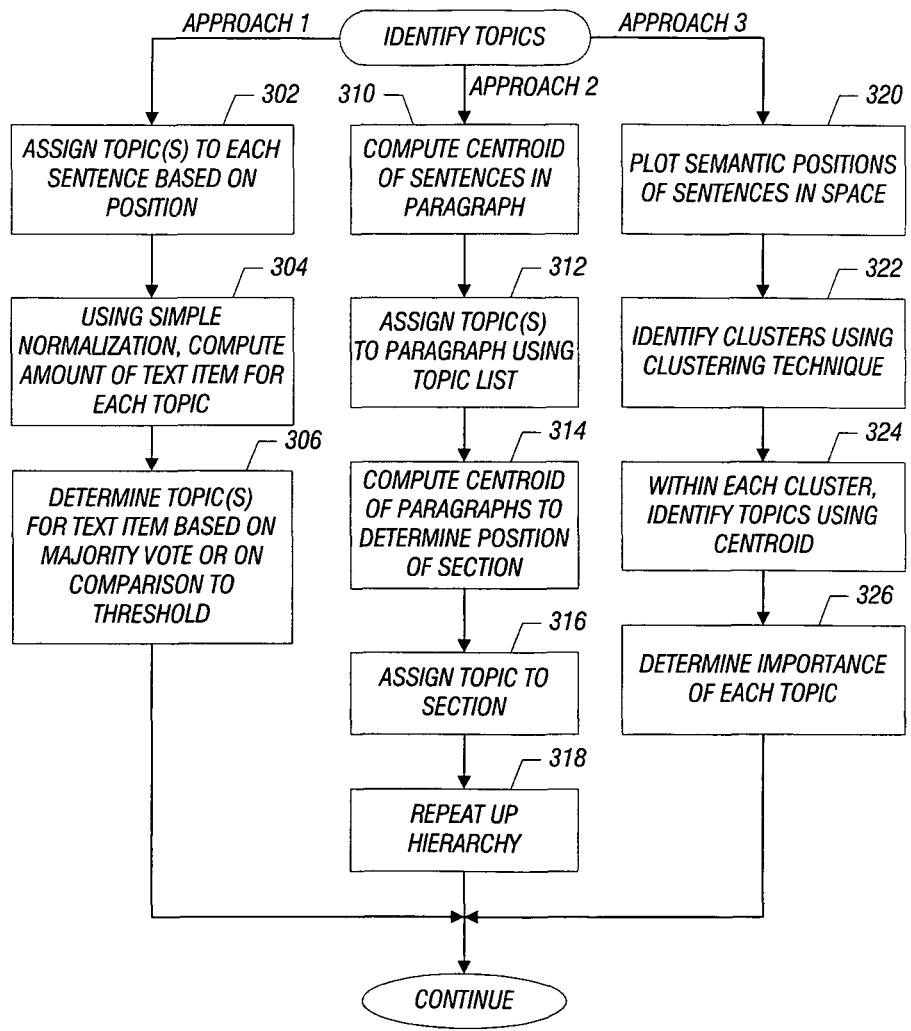
FIG. 3 is a flow diagram of a process of identifying topics associated with a text, in accordance with some embodiments.

Once semantic positions have been assigned to sentences (or other portions) of a text item, then various tasks can be performed with respect to the text item (and with respect to other text items for which semantic positions have been assigned). One such task is identifying one or more topics for the text item. There are several possible techniques of assigning topic(s) to a text item. In a first approach, as depicted in FIG. 3, the list 122 of topics (FIG. 1) is accessed (at 302) to assign one or more topics to each sentence of the text item based on the position of each sentence. As noted above, the list 122 of topics allows one or more topics to be identified based on a semantic position of a portion (such as a sentence) of a text item. Then using simple normalization, the amount (e.g., a percentage) of each text item that is related to particular topic is computed (at 304). Thus, for example, if a text item has 20 sentences, then each sentence constitutes 5% of the text item, in one example implementation. Thus, for example, if three sentences in the text item relate to topic one, two sentences related to topic two, and only one sentence relates to topic three, then the amount of the text item that is related to topic one is 15% (three sentences out of 20 sentences), the amount of the text item related to topic two is 10%, and the amount of the text item related to topic three is 5%. In another embodiment, the normalization could take into account the number of words or characters in each sentence.

The topic(s) for the text item is then determined (at 306) based on a plurality vote or based on all topics associated with an amount over some percentage threshold. With the majority vote approach, the topic with the largest vote (in terms of percentage) is identified as the topic for the text item. Thus, in the above example, topic one would have the majority vote and would thus be indicated as the topic for the example text item. But in the approach in which topics above a certain percentage threshold are identified, then multiple topics can potentially be selected for the text item. In the above example, if the threshold is 10% or greater, than topics one and two would be selected as topics for the example text item. Other methods of combining weights for topics to arrive at a set of topics can also be used. In particular, other methods that treat the choice as an election in which the topics are candidates and the sentences (or other parts) are voters can be used.

Alternatively, instead of selecting topics based on the just the sentences of the text item, selection can be performed hierarchically (taking into account topics for higher-level portions of the text item, such as paragraphs, sections, chapters, or even the entire text item). In the hierarchical approach, a topic for each paragraph can be selected based on majority vote among topics for sentences within that paragraph. Then, the same procedure can be repeated higher up in the hierarchy, where the majority vote of topics within a section can be performed based on topics assigned to paragraphs within that section. This process can be repeated iteratively at increasing hierarchical levels up to the entire text item (for example, the topic selected for the text item can be the topic selected by majority vote based on topics of chapters or sections within the text item). Alternatively, instead of majority vote, topics selected based on percentages over a threshold can be selected.

In a second approach that is different from the first approach, as depicted in FIG. 3, centroids of respective sentences within a paragraph are computed (at 310) to determine the semantic position of a paragraph that contains the sentences. This computation is repeated for each of the paragraphs in the text item such that the semantic position for each paragraph is obtained.

Next, the topic list is accessed to assign (at 312) a topic (or plural topics) to each paragraph, based on the semantic position of each paragraph. Next, according to one implementation, the centroid of the paragraphs within a section is computed (at 314) based on the semantic positions of the paragraphs. This centroid is used to find a semantic position of the corresponding section in which the paragraphs are contained. The process is repeated for each of the other sections within the text item to find a semantic position of such other sections. Using the semantic position of each section, a topic is assigned (at 316) to each section by accessing the topic list 122. Alternatively, instead of assigning the topic to a section based on the centroid derived from semantic positions or paragraphs within the section, the voting approach discussed with respect to the first technique can be used instead to select the topic having the majority vote within the section. This topic having the majority vote is then assigned (at 316) as the topic for the section.

The tasks of 314 and 316 can then be repeated (at 318) for higher-level portions of the hierarchy, until one or more topics for the entire text item is identified.

In a third approach that is different from the first and second approaches, the semantic positions of sentences within the text item (or within each paragraph, section, chapter, etc.) are plotted (at 320) within the semantic space. Then, using a clustering technique, such as K-means clustering or some other clustering technique, clusters of sentences are identified (at 322). Each cluster is also referred to as a partition, where each cluster includes a subset of the sentences considered.

Within each cluster, the centroid of the cluster is used to identify (at 324) the topic(s) associated with the cluster, by accessing the list 122 of topics.

The importance of each topic identified at 324 is determined (at 326) based on the percentage of the text item each cluster takes up. Note that a text item has clusters, possibly of differing sizes. A larger cluster can indicate that the topic(s) associated with the larger cluster is more important (or otherwise more significant) to the text item. For example, if a text item has four clusters, and one of those clusters is much larger than the other three clusters, then the topic associated with that large cluster will be considered to be more important than the topics of the other three clusters. The determined importance can be used to assign parameters (such as a percentage or weight) to respective clusters to indicate the likelihood that the particular text item is associated with each corresponding topic.

Once the topic(s) for each text item (or for portions of the text item) has (have) been identified, the identified topics can be used to perform some other task. The identified topics can be used in a document management system, such as database management system, a search engine, or for some other application. Each text item in a dataset can be associated with metadata, wherein metadata contain a list of one or more topics associated with the text item. The metadata can either be part of the text item itself, or the metadata can be separate from the text item.

As discussed above, a position-based feature dictionary 120 is used to determine semantic positions of portions of a text item, based on the senses assigned to word forms within each portion of the text item. The position-based feature dictionary 120 maintains records that correspond to different senses of each word form.

The feature-based position dictionary 120 identifies with each sense of each word form a position (semantic position) in some n-dimensional space that has the property that if two senses of two words are related to one another, these two senses will be near each other within the n-dimensional space. More related senses are closer in the n-dimensional space than less related senses. The position-based feature dictionary 120 is created (or updated) by a feature dictionary generator 130 (FIG. 1).

In accordance with some embodiments, a graph relaxation technique is used by the feature dictionary generator 130 to assign positions to the senses of words within the position-based feature dictionary 120. The graph relaxation technique herein described has historically typically been used to determine a visually pleasing two- or three-dimensional layout of a complex graph structure. The graph relaxation technique starts with a graph, which is a collection of nodes and edges between nodes. Each edge has an associated desired or target length, which is the optimal distance in the resulting graph between the two nodes that the edge connects. If there is no reason not to do so, the nodes are spaced apart by this desired length. Each edge within the graph also has a property related to the willingness of the edge to stretch and shrink. An edge can be thought of as a rubber band or spring. If two nodes are further apart than they should be, then this property can be used to compute a tension on the edge, which tension is a measure of how much the edge would like to pull the nodes closer together. Similarly, if nodes are closer together than they should be, then the property can be used to compute a compression on the edge, which is a measure of how much the edge would like to push the nodes further apart. Different edges connected to any particular node may have different properties, so that a node that has two edges attached may feel a greater pull by one edge than by the other edge. Each edge may have a simple rule (which defines the property) that computes its tension based on the difference between its actual length and desire length. Alternatively, each edge can have a rule that is a non-linear rule. Also, in some implementations, the rule used for when an edge is too long can be different than the rule for when the edge is too short.

The following describes generally a process of computing the layout of a graph that can be used by the feature dictionary generator 130 according to some embodiments. The application of this procedure to generating a position-based feature dictionary 120 is described further below. The layout is checked to insure that there is an edge between every pair of nodes. In one implementation, the feature dictionary generator 130 can accomplish this by computing the length of the shortest path between each pair of nodes and using either that length or some value based on the length. The length can be based on actual edges connected between each pair of nodes, or the length can be computed incrementally by adding edges (where no edges previously existed) between the nodes. In some embodiments less than all pairs are required to have edges between them.

Once a sufficiently-connected graph is derived, each node can be thought of as a particle, and each edge can be thought of as an attractive or repulsive force between two particles. The collection of particles and attractive/repulsive forces therebetween is a physical system. The problem to be solved is to find the state to which such a physical system (representing the fully-connected graph) will transition. For a large system, solving the problem can be computationally intensive. In accordance with some embodiments, an approximation technique can be used to determine the state that the physical system would wind up in.

With the approximation technique, an initial position for the nodes in the graph is determined. The initial positions of the nodes can be identified by any one of: scattering the nodes randomly across the space; assigning the nodes onto the perimeter of some n-dimensional sphere; or attempting to start the nodes in "relatively good" positions. To find such "relatively good" positions, the nodes are added to the space incrementally, with each node being placed such that n of its edges are the correct length relative to the nodes already placed.

Once the initial placement has been made, the forces on each node are computed by summing, in a vector fashion, the tension and compression on each edge attached to the node. The resulting force vector for each node represents the degree and direction that the physical system would like the node to move. The node with the greatest net force on it is allowed to move until its net force becomes zero (in other words, until the forces exerted by each edge become zero or cancel one another out). In an alternative embodiment a smaller number of nodes are selected at random and the selected node with the greatest net force on it is moved. The forces on each other node connected to the moved node are then updated to account for the recently-moved node's new position. Then, another node is selected for moving within the physical system. The iterative process typically ends when a given number of iterations have been made or when the greatest net force has magnitude below some threshold.

The nodes in the graph discussed above represent word senses. Thus, each node represents a single sense of a single word (or phrase). As a consequence of the relaxation on the graph, each word sense will acquire a single position in n-dimensional space (each word sense becomes associated with an n-tuple of numbers). The n-tuple of numbers represents the position of the word sense in the n-dimensional space. In other words, each tuple has n attributes to represent corresponding positions in the n dimensions.

Figure 4:
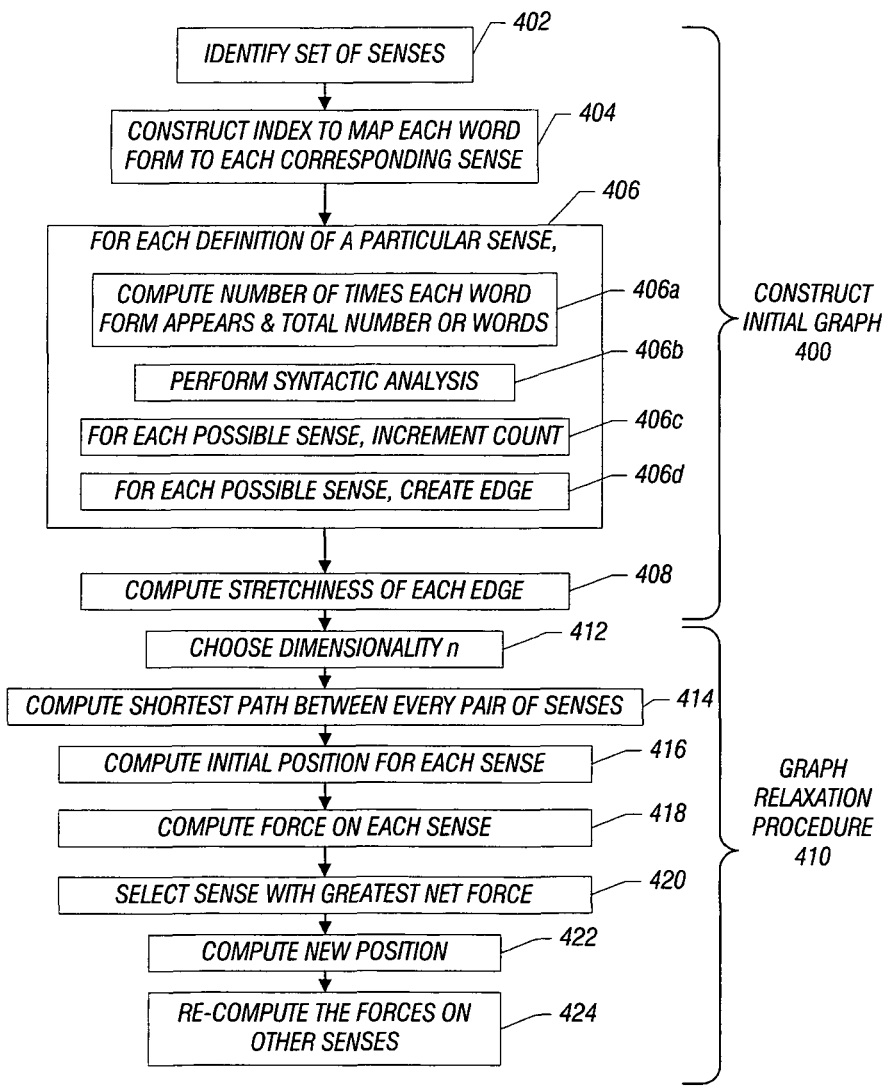
FIG. 4 is a flow diagram of a process of performing graph relaxation to determine semantic positions of word senses in a semantic space, in accordance with an embodiment.

A process performed by the feature dictionary generator 130, in accordance with an embodiment, is depicted in FIG. 4. First, the feature dictionary generator 130 constructs (at 400) an initial graph (as discussed above). In constructing the initial graph, the feature dictionary generator 130 acquires (at 402) a set of senses defined by a general purpose and/or special purpose dictionary. In some embodiments the feature dictionary generator 130 can access electronic representations of one or more dictionaries created for human readers, such as the Merriam-Webster's Collegiate Dictionary, the Oxford English Dictionary, the American Heritage Dictionary, or any other general-purpose dictionary. Such dictionaries are collections of entries, each of which generally contain the following information: a headword, a part of speech; an optional list of morphological exceptions; and one or more sense definitions.

The headword may actually be a phrase including several words. It makes no difference to the feature dictionary generator 130 if a sense is a meaning of single word or a single phrase.

Some dictionaries may combine different parts of speech into a single entry, and some dictionaries may specify different morphological exceptions for different senses. Such different treatments are acceptable to the feature dictionary generator 130 as long as the feature dictionary generator 130 can extract one or more word forms, a part of speech, and a definition. The word forms can be computed from the headword based on the part of speech and the morphological rules of the language in question, along with any exceptions specified by the particular dictionary. For example, the intransitive verb "walk" in English allows the feature dictionary generator 130 to assume the word forms "walks," "walked," and "walking" (and possibly, "will walk," "has walked," etc.) as referring to the same definition. An entry in the dictionary may also tell the feature dictionary generator 130 that the word "hit" does not, in fact, have "hitted" as its past tense form, and that "break" has "broken" as its past participle rather than "breaked." As with head words, the word forms may actually be multi-word phrases.

In addition to using general-purpose dictionaries, such as those listed above, the feature dictionary generator 130 may also augment its input with one or more special-purpose dictionaries, such as dictionaries for technical terms, names of people or products, jargon, or slang. These special-purpose dictionaries may contain similar information as the general-purpose dictionaries, with these special-purpose dictionaries generally defining senses that usually do not occur in a general-purpose dictionary. The dictionaries (including general-purpose and special-purpose dictionaries) that the feature dictionary generator 130 accesses for producing senses for word forms can be combined prior to use by the feature dictionary generator 130. Alternatively, a graph based on general-purpose dictionary senses can first be produced, followed by adding senses from the special-purpose dictionaries.

After acquiring the set of senses (at 402), an index is constructed (at 404) to represent a mapping from each word form (actually seen by the feature dictionary generator 130 or inferred by the feature dictionary generator 130) to each sense that the word form is associated with.

Sense definitions are then used by the feature dictionary generator 130 to define edges between nodes (which represent senses) in the graph. The index is used to associate a group of senses with each word form that appears in the definition of a particular sense. For each sense in the union of these groups, the feature dictionary generator constructs an edge from the current sense, with each edge having a desired length as well as a stretchiness factor.

In one embodiment, the desired length (representing the distance between nodes) of each edge is proportional to the length of the definition for the particular sense, and the stretchiness is proportional to the number of times the word form is used elsewhere. In other words, if a sense has a short definition, then each word in the definition is considered to be more likely closely related to the sense being defined than if the sense has a long definition. On the other hand, a word that is used in many definitions of many senses is probably less likely to be closely related to any specific one of them. For example, a word such as "the" is part of the definitions of many senses, and thus is not actually likely to contribute semantically to any of the senses. Thus, a word such as "the" that is included in a large number of senses can be discounted. In graph relaxation, short definitions cause nodes to be closely together, and edges to unusual words pull harder than edges to common words.

A specific procedure that is part of constructing the graph at 400 is further described as follows. For each definition of a particular sense, the procedure 406 is performed. The number of times that each word form appears in the definition, and the total number of words in the definition, are computed (at 406*a*). The ratio between these two numbers (Total/Count, where Total represents the total number of words and Count represents the number of times each word form appears in the definition) can be defined as the desired length of the edges between the current sense (the sense that is being defined by the definition) and the allowed senses of each of the words. Instead of Total/Count, some other value based on Total/Count can be used to define the desired length, such as a square of the ratio or some other value. Each definition of a particular sense includes a number of words, where each of the words in the definition is associated with a number of possible senses. Edges are thus defined between the particular sense and each of the possible senses of the words in the definition. The edges are assigned a desired length equal to the ratio Total/Count (or some other value based on such a ratio).

In one example, assume that a particular sense being processed is sense 3 of the word orange (orange_3), and that the definition for orange_3 includes the word "fruit." Assume further that "fruit" has five senses: fruit_1 through fruit_5. Then an edge, and a corresponding desired length, is defined between orange_3 and each of fruit_1 through fruit_5.

For the definition of the particular sense, a syntactic analysis can be performed (if possible) (at 406*b*) to narrow down a set of possible senses for each word form in the definition. For example, if the definition contains the phrase "the runs," then the feature dictionary generator 130 will be able to determine syntactically that "runs" should be a noun, not a verb, so that verb senses can be excluded. In the above example, one or more of the senses fruit_1 through fruit_5 can be eliminated based on this syntactic analysis.

Then, for each possible sense of each word in the definition, a count of the number of times the sense has been used (in the entire dictionary) is incremented (at 406*c*), and an edge from the particular sense to the possible sense is created (at 406*d*), using the desired length calculated above. The created edge is associated with the group of possible senses.

In the above example for the sense orange_3, the three possible senses for the word "fruit" in the definition of orange_3 are fruit_2, fruit_3 and fruit_4, assuming that the senses fruit_1 and fruit_5 have been eliminated at 406*b*. The goal is to further prune the remaining three senses so that only one of the three edges (to the three senses fruit_2, fruit_3, and fruit_4 from orange_3) is selected, which selected sense of "fruit" is the correct sense of the word "fruit" in the definition of orange_3. To keep track of the ambiguity, the possible senses are maintained in a group (fruit_2, fruit_3, fruit_4), which group is associated with each edge to the possible senses. Alternatively, a group of the three edges to the three possible senses can be associated with each edge. The associated group allows the feature dictionary generator 130 to know which edges are in competition with each other.

For each edge, the stretchiness based on the counts associated with each sense in the group is computed (at 408). The greater the count, the stretchier the edge (in other words, the less pull it asserts on its end-points or nodes that are connected to the edge). For example, a first sense of the word "beagle" (beagle_1) may have the following definition:

any of a breed of small short-legged smooth-coated often black, white, and tan hounds.

It can be determined, in one example, that the word "breed" occurs 432 times in definitions of the dictionary (which is the count computed at 406*c*). The word "white" occurs 1,149 times in definitions of the dictionary. In this example, the edges from "beagle_1" to the various senses of "white" would be roughly three times as stretchy as the edges from "beagle_1" to the various senses of "breed," which indicates that "breed" is more closely related to "beagle" than "white."

The mapping from counts to stretchiness does not have to be linear—the mapping can be non-linear (such as stretchiness that is proportional to the square of the count or a logarithm of the count). The stretchiness is augmented by the likelihood that the real sense is one of the other ones in the group of senses associated with the edge. For example, if one sense of the word had a likelihood of one in four, the stretchiness can be proportional to four times what the count would indicate, while if another sense has a likelihood of one in two, the stretchiness of the edge to this other sense will be multiplied by two. When computing this likelihood, all senses can be considered equally likely, or there could be a bias for or against some senses. In particular, if a dictionary lists words in frequency order (as apposed to historical order), then more weight can be given to senses that occur earlier in an entry of the definition, as those are the senses more often used. Senses that carry usage labels, such as "archaic," "obsolete," "slang," or "vulgar" can be given less weight, as they are less likely to be senses used by those constructing the dictionary.

Once the initial graph is constructed, the graph relaxation procedure (410) is executed by the feature dictionary generator 130. A dimensionality n is chosen (at 412). To ensure that there is a single edge between every pair of senses, the shortest (directed) path between each pair of senses is computed. The directed path refers to an arc having a direction from the sense being defined to the sense used to define the sense being defined. The shortest path between each pair of senses can be used to obtain the desired length and to perform some combination on the stretchiness of each segment in the path. In the above example for "beagle," a directed path exists from "beagle" to "breed." Also, a directed path may exist from "breed" to "domesticated," which appears in the definition of "breed". However, there is no arc from "beagle" to "domesticated," so such an arc is created based on the two arcs that already exists. The newly created arc will have its own desired length (based on the desired length of the existing arcs) and stretchiness (based on the stretchiness of the existing arcs). Going further, the word "domesticated" has the word "adapt" in its definition, so another arc may be created to extend from "beagle" to "adapt."

The reason that direction of edges (arcs) is used is that while there is an edge from "beagle" to "breed" and an edge from "eugenics" to "breed," this fact should not be used to infer a close edge between "beagle" and "eugenics." However, only one link between a pair of senses is sufficient, so that if "beagle" has implied that it should be close to "breed," then the fact that there is no close path from "breed" to "beagle" should not mean that "beagle" and "breed" should be far away.

In performing task 414, to reduce the number of edges so that data can fit in higher-speed memory, a probabilistic approach to adding edges can be used. In the probabilistic approach, the probability of adding an edge is decreased with the number of edges in a path. For example, senses that are a few steps (e.g., <5) away from each other should probably have edges defined between them for reasonable positioning. However, for senses that are a large number (e.g., >10) steps apart from each other, some small fraction of the edge between such senses can be added. In some embodiments, the process of adding edges is allowed to stop when all (or substantially all) have at least a predefined minimum number of edges connecting them to other senses or to other senses which are not neighbors in the original graph.

Alternatively, a well-defined "distant edge" can be used when no actual edge is defined between remote senses. That distant edge wants to be a certain distance away (and can be defined based on actual short paths seen). The distant edge can be easily stretched, and is somewhat resistant to mild compressions and very resistant to compressing below a threshold.

An initial position for each sense is then computed (at 416) (either randomly, around a circle, or incrementally). A force on each sense is computed (at 418) due to the edges. The sense with the greater net force on the sense is selected (at 420), and a new position of the sense is computed to leave the sense with a zero net force. The forces on every other sense is recomputed (at 424) based on the current sense having moved. The process at 420, 422, 424 is repeated until no further sense needs to be moved, until the greatest force on any sense (or on any of a random selection of senses) is below some threshold, or until some budget is exceeded.

As a result of the graph relaxation procedure, each sense has a position, expressible as an n-tuple, which can be used in the feature dictionary 120. The feature dictionary 120 provides a mapping from each word form to a set of positions (associated with different senses). In some implementations, the feature dictionary 120 created so far can be used. However, in other implementations, the feature dictionary can be further refined as discussed below.

Figures 5, 6:
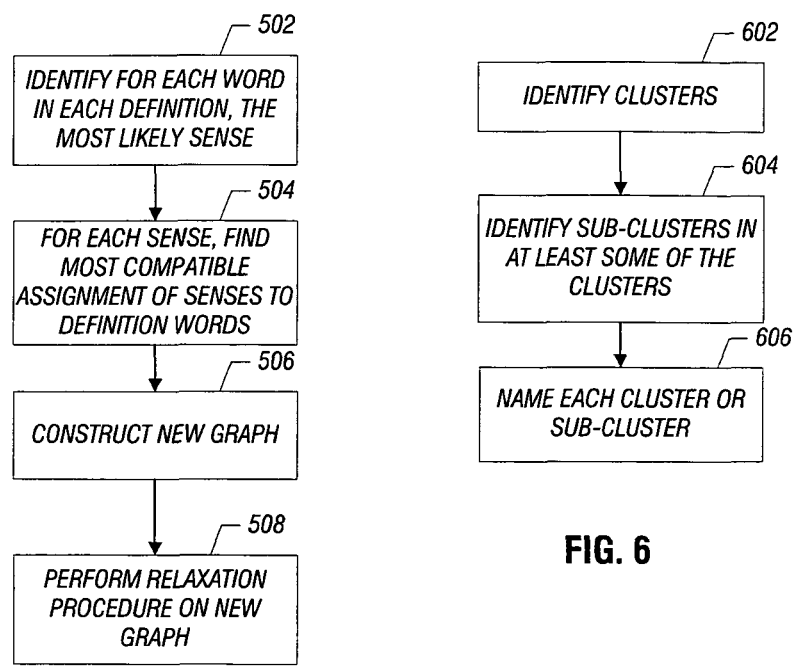
FIG. 5 is a flow diagram of a process of refining the graph produced by the process of FIG. 4, in accordance with an embodiment.
FIG. 6 is a flow diagram of a process of identifying clusters and sub-clusters to assign topics to word senses in a semantic space, in accordance with an embodiment.

As shown in FIG. 5, to refine the feature dictionary 120, the feature dictionary generator 130 attempts to identify (at 502) for each word within each definition the most likely sense to be used based on the notion that the senses used in the definition are probably the ones most closely related to one another. For each sense, the feature dictionary generator 130 finds (at 504) the most compatible assignment of senses (group of senses) to definition words. For any given assignment (group), a center of mass can be computed based on the average positions (in the relaxed graph) of the senses used. A measure of compatibility can be based on the mean of the distances (or mean of the square of the distances, or the harmonic mean of the distances) between each sense in the particular group of senses and the center of mass. Alternatively, a weighted mean can also be used, with the weight factor inversely proportional to the stretchiness of the edges associated with the sense, so that it becomes more important to choose the correct sense of unusual words. Smaller measure values represent more compatible assignments.

The search for the most compatible assignment can be performed by any of a number of techniques, such as a greedy approach, a genetic algorithm approach, an analytic approach, and an exhaustive search (discussed above with respect to task 206 in FIG. 2).

Once this reduction has been performed for each sense, a new graph is constructed (at 506) using only the edges corresponding to the senses chosen to correspond to the words in each definition. This results in fewer explicit edges and different stretchiness factors on each edge (since the stretchiness factors will be based solely on the new usage counts). Next, a relaxation procedure is performed (at 508) on the new graph, where the relaxation procedure is similar to the relaxation procedure described with respect to FIG. 4. The initial position used in the relaxation procedure at 508 can be based on the final position of the relaxed graph according to FIG. 4.

The relaxed graph is associated with the positions for various senses, which positions are used in the feature dictionary 110.

In the FIG. 5 optimization, reductions are performed before the relaxation procedure is performed at 508. If computation bandwidth is not an issue, then the following refinement of the graph can be performed. A reduction is performed on a single sense (or on some group of senses), with the graph modified to remove discarded edges. The stretchiness on other edges is updated and new inferred edges are computed. Next, graph relaxation is performed. The above is then repeated for more senses in a graph. This procedure benefits in that the later-reduced senses get to benefit from earlier reductions. The senses can be processed in some random order, in alphabetical order or in some other predefined order. Senses can be allowed to be reduced more than once, iterating until a change is negligible.

In some embodiments, senses that are identified as purely functional are not represented in the graph. The senses will be identified by their part of speech, and would include prepositions, articles, and pronouns, as well as other determiners (in accordance with one implementation). Provisions can be made to allow explicit additions and exceptions of functional senses.

These functional senses can still exist and may even be recorded in the feature dictionary 110. However, such senses would simply not take part in graph relaxation (including the calculation of inferred edges), and would not receive a final position. However, in other implementation, the senses can be excluded from the feature dictionary, since it may be worthwhile to ignore these functional senses during textual analysis.

The main reason for ignoring functional senses in the graph relaxation is to avoid there being much of a contribution for the transitive distance computation from the often-long definitions of these words. Note that the words can still be part of phrases that have their own senses. Note that such a stopword may also have senses that are not purely functional, such as the term "over" used as a term in cricket. Therefore, sense disambiguation can be performed to decide whether it is more likely that the sense is use as a functional term or as a non-functional term.

After the feature dictionary 110 has been created, it may be desirable at some later time to modify the feature dictionary by adding entries from new special-purpose dictionaries. To avoid drastically warping the semantic space and thereby invalidating any analysis that have been made based on the current positions in the feature dictionary, some embodiments may consider that existing senses are not candidates for movement. In other words, the positions of the existing senses are maintained fixed, with only the newly added senses being allowed to move during relaxation.

Alternatively, existing senses may be allowed to move, but only by a restricted distance (some predefined restricted distance). This can be accomplished by considering each sense to have an edge from its current immobile position, which is heavily resistant to stretching above some fixed distance. This could also be performed by modifying the algorithm to prevent motion of existing senses past a threshold.

Another data structure stored in the computer 100 is the list 122 of topics discussed above that is accessed by the topic identifier 105 (FIG. 1) to determine topic(s) for a text item (or a portion of the text item). The list of topics 122 is created by a topic list generator 132. As noted above, an aspect of the feature dictionary 110 is that senses that are related to one another will be close to each other in the semantic space. The relatively dense locales of senses can constitute topics. For example, all (or most) of the senses that had to do with animals will likely wind up in one region of the semantic space, while all (or most) of the senses that have to do with sports will wind up in another semantic space. A word like "shark," which has senses in two domains (the fish and the San Jose hockey team) will have senses that lie in both regions. To identify topics, these regions of commonality (dense locales) are identified by the topic list generator 132 and named (with some label that corresponds to the respective topic).

In an approach according to an embodiment, a clustering technique can be used. With the clustering technique, as defined in FIG. 6, a set of rules is identified that will assign each sense (or each of most of the senses) into exactly one cluster (or perhaps plural clusters) such that the resulting assignments of senses to clusters is optimal by some measure. Most clustering techniques involves picking some number of points in space (or nodes in the graph) and considering them as centroids, with the rule being that each sense belongs to the topic whose centroid is physically nearest to its position.

Once clusters have been identified (at 602), the largest cluster is processed recursively to identify sub-clusters (at 604). The sub-clusters correspond to subtopics. Thus, for example, within an "animals" topic, there may be subtopics having to do with birds, fish, land animals, and insects, while within the "sports" topic, there may be subtopics dealing with basketball, baseball, and so forth. Terms common to two different sports, such as "game" or "win" would tend to be near the centroid of the "sports" topic, while terms specific to single sports (such as "puck" or "inning") would be clustered together off to the side, but still relatively nearby.

When the topics (and subtopics) have been identified, the next task is to pick (at 606) a meaningful name for each topic (or subtopic). The naming can be performed automatically or manually. If done automatically, one approach is to take the sense whose position lies nearest to the centroid, with that sense used as the topic name. Although this approach will work most of the time, surprising results may occasionally occur if a less-meaningful sense happens to be closer. There may be several tasks that can be performed to make this less likely. First, the choice of the name can be limited to be a noun (or a noun phrase). Alternatively, the frequency of the sense use can be considered as well as the distance from a cluster centroid. For example, if sense A is closer than sense B to a cluster centroid, but sense B is used in more definitions than sense A, then sense B may be a better choice.

To name a topic manually, a list of senses in the topic can be presented to a user, ordered by distance from the corresponding cluster centroid. A list of the top number (e.g., 20, 50, etc.) of such senses will likely trigger the user to assign a meaningful name.

A combined approach can be used in a different embodiment, where a system can automatically assign names to corresponding clusters and sub-clusters, with these automatically generated names presented to users to confirm whether any of the topics are poorly named and to allow a user to suggest a substitute.

The end result of the procedure of FIG. 6 is the list 122 of topics, each with a name and a position (or some other rule that allows one to decide whether or not a semantic position should be considered within the topic, as discussed above). The list 122 can be used as-is or a subset can be drawn by user for a specific task. This allows the user to focus only on topics of interest. Text which appears to not fall into one of the identified topics will simply not be tagged.

The topics of the list 122 can be associated with corresponding decision procedures (or decision functions) that can be used for the purpose of identifying whether a portion of a text item (or the entire text item) is associated with corresponding topics. A "decision procedure" (which can be implemented as a software routine, for example) includes logic that is used to make a decision regarding whether a particular text portion is associated with a topic in the list 122.

For example, if the topics in the list 122 are associated with corresponding semantic positions, then the decision procedure can use the logic to determine whether the text portion is closer to the semantic position of this topic than to the semantic positions of other topics, or alternatively, to compute a likelihood measure that the text portion is associated with this topic based on the semantic position of this topic and possibly semantic positions of other topics. As examples, the decision procedure can be any one of the following: logic that considers the semantic position of the topic; logic that considers some defined region (whether spherical region or some arbitrarily-shaped region) in the semantic space associated with the topic; a Boolean function (to return a true or false response for indicating whether a semantic position of a text portion is in the topic); any other type of function, including a real-valued function (that returns a real, numeric value providing some representation of the relationship between the semantic position of a text portion and the topic), an integer-valued function (that returns an integer value providing some representation of the relationship between the semantic position of a text portion and the topic), a discrete-valued function (to return a value indicating how probable a semantic position of a text portion is related to the topic, such as "definitely," "probably," "maybe," probably not," etc.); and a computer program (any arbitrary function according to a programming language that provides as output an indication of relationship between the semantic position of the text portion and the topic).

Effectively, the decision procedure, when applied to a semantic position of a text portion, can assign a degree of likelihood (e.g., true, false, yes, no, 95%, 50%, etc.) to the semantic position. This assigned degree of likelihood provides an indication of whether or not a particular topic from the list 122 should be identified as a topic to output for the text portion.

Instructions of software described above (including text analysis software 102, semantic position identifier 104, topic identifier 105, feature dictionary generator 130, and topic list generator 132, of FIG. 1) are loaded for execution on a processor (such as one or more CPUs 118 in FIG. 1). The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom.

It is intended that the appended claims cover such modifications and variations as fall within the true spirit and scope of the invention.

What is claimed is:

1. A method executable by a computer, comprising:
receiving word senses associated with respective definitions, wherein each of the definitions includes one or more words; and
providing a position-based dictionary that assigns the word senses to respective semantic positions in a semantic space, wherein the semantic positions of the word senses are related to each other based upon words contained in the respective definitions of the word senses.

2. The method of claim 1, wherein assigning the word senses to respective semantic positions comprises determining relations of pairs of the word senses, wherein, in general, more related pairs of word senses are closer in the semantic space than less related pairs of senses, wherein the relation between each pair of word senses depends upon the words contained in the definitions of the respective word senses in the pair.

3. The method of claim 1, further comprising using a graph relaxation technique to assign semantic positions to the word senses.

4. A method executable by a computer, comprising:
receiving word senses associated with respective definitions, wherein each of the definitions includes one or more words; and
providing a position-based dictionary that assigns the word senses to respective semantic positions in a semantic space, wherein the semantic positions of the word senses are related to each other based upon words contained in the respective definitions of the word senses; and
using a graph relaxation technique to assign semantic positions to the word senses, wherein using the graph relaxation technique comprises:
determining initial positions of nodes in a graph, wherein the nodes represent at least some of the word senses;
defining edges between the nodes;
determining forces on nodes due to the edges, the forces dependent upon words contained in the respective definitions for corresponding word senses; and
adjusting positions of the nodes in the graph to reduce forces on the nodes.

5. The method of claim 4, further comprising recomputing forces on the nodes after moving the nodes,
wherein the adjusting and recomputing are iteratively repeated until a stopping criterion is satisfied.

6. The method of claim 4, wherein the defined edges between nodes represent relationships between respective word senses, the method further comprising:
determining a desired length of each of the edges, wherein the desired length of each edge is computed based on a length of a definition of the corresponding word sense, wherein forces applied in nodes are dependent on the desired lengths of the edges.

7. The method of claim 1, further comprising:
accessing at least one other dictionary to find the definitions for the word senses; and
creating the position-based dictionary based on the definitions of the at least one other dictionary.

8. The method of claim 7, wherein accessing the at least one other dictionary comprises accessing at least one of a general-purpose dictionary and a special-purpose dictionary.

9. The method of claim 1, wherein a particular definition for a particular one of the word senses includes word forms, wherein at least one of the word forms in the particular definition has plural possible senses, the method further comprising:
performing syntactic analysis to eliminate one or more of the plural possible senses as being part of the particular definition for the particular sense.

10. The method of claim 1, further comprising identifying at least one word sense as a functional word sense.

11. The method of claim 1, further comprising:
receiving additional word senses from a special-purpose dictionary;
modifying the position-based dictionary by adding the additional word senses from the special-purpose dictionary, wherein in modifying the position-based dictionary existing word senses in the position-based dictionary do not move or are moved by less than some predefined amount.

12. A method executable by a computer, comprising:
receiving word senses associated with respective definitions, wherein each of the definitions includes one or more words; and
providing a position-based dictionary that assigns the word senses to respective semantic positions in a semantic space, wherein the semantic positions of the word senses are related to each other based upon words contained in the respective definitions of the word senses,
wherein the semantic positions of the word senses are defined by edges between respective pairs of nodes representing corresponding word senses, wherein lengths of the edges are proportional to numbers of words contained in the respective definitions, and forces applied by the edges on corresponding nodes are based on numbers of times words in respective definitions appear in other definitions.

13. A method executable by a computer, comprising:
receiving word senses associated with respective definitions;
providing a position-based dictionary that assigns the word senses to respective semantic positions in a semantic space;
using a graph relaxation technique to assign semantic positions to the word senses, comprising:
determining initial positions of nodes in a graph, wherein the nodes represent at least some of the word senses;
defining edges between the nodes;
determining forces on nodes due to the edges; and
adjusting positions of the nodes in the graph to reduce forces on the nodes; and
determining a stretchiness of each of the edges, wherein the stretchiness of each edge associated with a particular word sense is computed based on a number of times a word form appearing in a definition of the particular word sense appears in definitions of other senses,
wherein forces applied on the nodes are dependent on the stretchiness of the edges.

14. A method executable by a computer, comprising:
receiving definitions of word senses provided by at least a first dictionary;
based on the received definitions, constructing a graph having nodes representing at least some of the word senses, the graph further having edges connecting the nodes to represent relationships between the respective word senses; and
producing a position-based dictionary based on the graph, the position-based dictionary assigning semantic positions in a semantic space to respective word senses.

15. The method of claim 14, further comprising applying a graph relaxation technique to move the nodes of the graph from initial positions to modified positions.

16. The method of claim 14, further comprising using a probabilistic approach to reduce a number of edges added to the graph.

17. A method executable by a computer, comprising:
receiving definitions of word senses provided by at least a first dictionary;
based on the received definitions, constructing a graph having nodes representing at least some of the word senses, the graph further having edges connecting the nodes to represent relationships between the respective word senses;
producing a position-based dictionary based on the graph, the position-based dictionary assigning semantic positions in a semantic space to respective word senses;
computing forces on the nodes of the graph;
selecting a node with a greater net force;
computing a new position for the selected node; and
repeating the steps of computing the forces, selecting the node, and computing the new position for other nodes in the graph.

18. A method executable by a computer, comprising:
receiving definitions of word senses provided by at least a first dictionary;
based on the received definitions, constructing a graph having nodes representing at least some of the word senses, the graph further having edges connecting the nodes to represent relationships between the respective word senses;
producing a position-based dictionary based on the graph, the position-based dictionary assigning semantic positions in a semantic space to respective word senses;
finding most compatible assignments of word senses to word forms that are part of definitions of other word senses; and
reducing a number of edges in the graph based on finding the most compatible assignments.

19. A computer-usable medium storing a position-based dictionary created by software executed on a computer to cause the computer to:
receive word senses associated with respective definitions, wherein each of the definitions includes one or more words; and
assign the word senses to respective semantic positions in a semantic space of the position-based dictionary based on the definitions, wherein the semantic positions of the word senses are related to each other based upon words contained in the respective definitions of the word senses.

20. The computer-usable medium of claim 19, wherein the position-based dictionary is created by causing the computer to further receive the word senses associated with respective definitions from at least one of a general-purpose dictionary and a special-purpose dictionary.

21. The computer-usable storage medium of claim 19, wherein the position-based dictionary is created by further causing the computer to:
based on the received definitions, construct a graph having nodes representing at least some of the word senses, the graph further having edges connecting the nodes to represent relationships between the respective word senses; and
produce the position-based dictionary based on the graph by applying a graph-relaxation technique.

22. A computer-usable medium storing a position-based dictionary created by software executed on a computer to cause the computer to:
receive word senses associated with respective definitions, wherein each of the definitions includes one or more words; and
assign the word senses to respective semantic positions in a semantic space of the position-based dictionary based on the definitions, wherein the semantic positions of the word senses are related to each other based upon words contained in the respective definitions of the word senses,
wherein the semantic positions of the word senses are defined by edges between respective pairs of nodes representing corresponding word senses, wherein lengths of the edges are proportional to numbers of words contained in the respective definitions, and forces applied by the edges on corresponding nodes are based on numbers of times words in respective definitions appear in other definitions.

* * * * *